(12) United States Patent
Iizuka et al.

(10) Patent No.: US 7,817,287 B2
(45) Date of Patent: Oct. 19, 2010

(54) OPTICAL THREE-DIMENSIONAL MEASUREMENT DEVICE AND FILTER PROCESS METHOD

(75) Inventors: Tomoyuki Iizuka, Tokyo (JP); Akihiro Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 184 days.

(21) Appl. No.: 12/250,703

(22) Filed: Oct. 14, 2008

(65) Prior Publication Data
US 2009/0135433 A1      May 28, 2009

(30) Foreign Application Priority Data
Nov. 22, 2007   (JP) ............................... 2007-303149

(51) Int. Cl.
*G01B 11/24* (2006.01)

(52) U.S. Cl. ........................ 356/601; 356/600; 356/609; 382/145; 250/559.22

(58) Field of Classification Search ......... 356/600–613; 382/145; 359/383, 559; 250/559.22, 559.29, 250/234, 548
See application file for complete search history.

(56) References Cited

U.S. PATENT DOCUMENTS

| | | | | |
|---|---|---|---|---|
| 5,614,662 A | * | 3/1997 | Hallan et al. .................. 73/105 |
| 5,812,269 A | * | 9/1998 | Svetkoff et al. ............. 356/602 |
| 6,166,853 A | * | 12/2000 | Sapia et al. .................. 359/559 |
| 7,576,869 B2 | * | 8/2009 | Fujii .......................... 356/511 |
| 2005/0270639 A1 | * | 12/2005 | Miki .......................... 359/381 |
| 2009/0153878 A1 | * | 6/2009 | Fujii .......................... 356/601 |

FOREIGN PATENT DOCUMENTS

JP        2004-184194 A         7/2004

* cited by examiner

*Primary Examiner*—Hoa Q Pham
(74) *Attorney, Agent, or Firm*—Holtz, Holtz, Goodman & Chick, PC

(57) ABSTRACT

This is an optical three-dimensional measurement device provided with observation illumination light for illuminating an observation specimen, an object lens for collecting the observation light on the observation specimen and a display unit for displaying an observation image and its measurement result that are obtained via the object lens. The optical three-dimensional measurement device comprises a filter process determination unit for determining a first filter process on the basis of observation conditions used when taking in a three-dimensional image of the observation specimen and a filter process unit for applying the first filter process determined by the filter process determination unit to the measurement image or the measurement result.

13 Claims, 9 Drawing Sheets

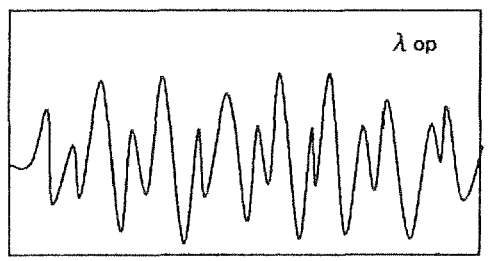
F I G. 3 A
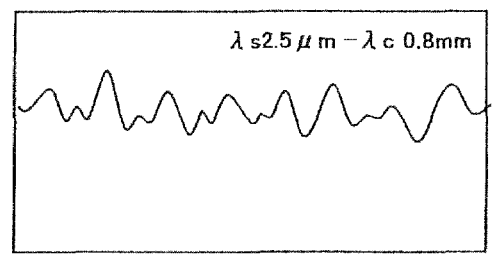
F I G. 3 B
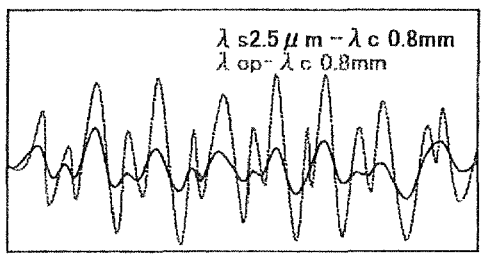
F I G. 3 C
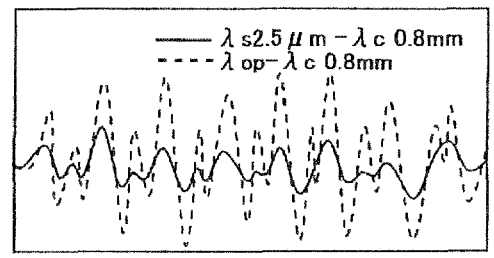
F I G. 3 D

| HIGH-FREQUENCY CUT-OFF FILTER | LOW-FREQUENCY CUT-OFF FILTER | Ra | Rp | Rt | Rv | ... |
|---|---|---|---|---|---|---|
| $\lambda$ s2.5 $\mu$m | $\lambda$ c 0.8mm | *** | *** | *** | *** | ... |

FIG. 6

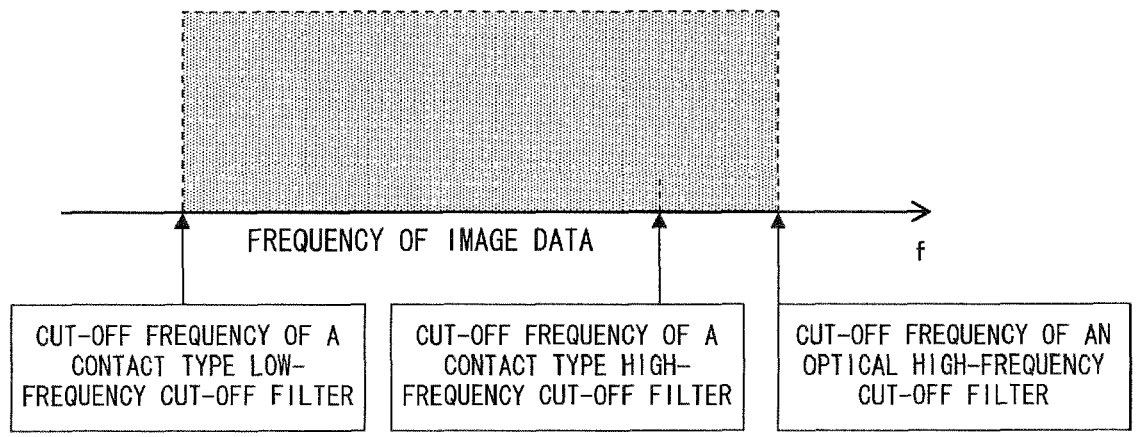
F I G. 7A
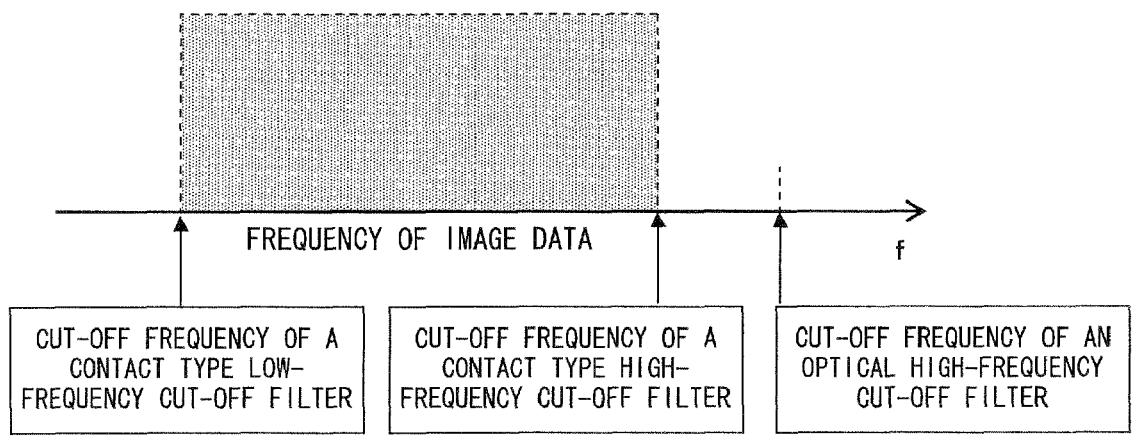
F I G. 7B

| HIGH-FREQUENCY CUT-OFF FILTER | LOW-FREQUENCY CUT-OFF FILTER | Ra | Rp | Rt | Rv | ... |
|---|---|---|---|---|---|---|
| $\lambda$ op | $\lambda$ c 0.8mm | *** | *** | *** | *** | ... |
| $\lambda$ s2.5 $\mu$ m | $\lambda$ c 0.8mm | *** | *** | *** | *** | ... |

F I G. 8

OPTICAL THREE-DIMENSIONAL MEASUREMENT DEVICE AND FILTER PROCESS METHOD

CROSS-REFERENCE TO RELATED APPLICATIONS

This application claims the benefits of Japanese Patent Application No. 2007-303149 filed Nov. 22, 2007, the contents of which are incorporated by this reference.

BACKGROUND OF THE INVENTION

1. Field of the Invention

The present invention relates to a non-contact type optical three-dimensional measurement device capable of measuring three-dimensional shapes.

2. Description of the Related Art

Generally, when carrying out non-contact type three-dimensional measurement, optical three-dimensional measurement devices, such as a confocal microscope, a white light interference meter and the like are widely known.

Patent Document 1 (Japanese Patent Application No. 2004-184194) discloses an example of the optical three-dimensional measurement device. The device of Patent Document 1 applies measurement light to an observation specimen and obtains the surface state of the observation specimen from its reflection light.

Each of these optical three-dimensional measurement devices obtains the shape data and observation image of an observation specimen including two- or three-dimensional information including the height direction of the observation specimen and measures it on the basis of the data and observation image.

The three-dimensional measurement means measurement including the height information of an observation specimen and it includes, for example, measurement based on two-dimensional information consisting of height data in a specific line shape (XY profile).

When carrying out three-dimensional measurement, an operator checks obtained shape data and an observation image, performs various image processes as requested and eliminates noise factors that appear in the obtained shape data and observation image. By this noise elimination work, the shape data and observation image nearer the actual shape of the observation specimen can be obtained and their more accurate three-dimensional measurement result can be obtained.

The three-dimensional measurement includes the distance in a specific position, level, area, volume roughness analysis and the like of an observation specimen.

As to roughness analysis, besides a non-contact type measurement device, such as the above-described optical three-dimensional measurement device, a method using a probe type roughness meter for touching and measuring an observation specimen is commonly known.

The principle of the probe type roughness meter is that the height data of an observation specimen can be obtained by tracing the surface of the observation specimen with a probe.

By applying a cut-off filter process depending on the shape of a used probe to the obtained height data, various roughness parameters which are defined on the basis of a prescribed computation method can be computed.

A probe type roughness meter has a longer history than the optical three-dimensional measurement device, its technology is mature and the technology of the cut-off filter process to apply is established.

A cut-off filter and roughness parameters obtained by applying the cut-off filter are defined in JIS and the like. Therefore, as to roughness analysis, an analysis method by a probe type roughness meter is widely recognized.

Some cut-off filtering functions and roughness analysis functions that are defined as roughness analysis by a probe type roughness meter in JIS and the like are also mounted on an optical three-dimensional measurement device. Therefore, the roughness analysis of an observation specimen can also be performed by these functions of the optical three-dimensional measurement device in the same way as the probe type roughness meter.

The optical three-dimensional measurement device has a merit of being able to perform a higher-resolution measurement than the probe type roughness meter.

However, in the case of the optical three-dimensional measurement device, if it is a scanning type confocal laser microscope, plane resolution in units of sub-microns can be obtained and if it is white interference meter, height resolution in units of several ten nanometers can be obtained. Therefore, higher-resolution three-dimensional measurement than the probe type roughness meter can be realized.

SUMMARY OF THE INVENTION

It is an object of the present invention to provide an optical three-dimensional measurement device capable of automatically selecting an optimal cut-off filter process and its filter process method.

It is also another object of the present invention to provide an optical three-dimensional measurement device capable of selecting the cut-off filter process of a probe type roughness meter without applying any process to it, as requested and its filter process method.

An optical three-dimensional measurement device according to the present invention provided with observation illumination light for illuminating an observation specimen, an object lens for collecting the observation light on the observation specimen and a display unit for displaying an observation image and measurement result that are obtained via the object lens comprises a filter process determination unit for determining a first filter process on the basis of an observation condition used when taking in the three-dimensional image of the observation specimen and a filter process unit for applying the first filter process determined by the filter process determination unit to the measurement result.

Furthermore, a filter process method according to the present invention is one implemented by an optical three-dimensional measurement device provided with observation illumination light for illuminating an observation specimen, an object lens for collecting the observation light on the observation specimen and a display unit for displaying an observation image and measurement result that are obtained via the object lens further comprises determining a first filter process on the basis of observation conditions used when taking in the three-dimensional image of the observation specimen and applying the filter process determined by the filter process determination unit to the measurement result.

BRIEF DESCRIPTION OF THE DRAWINGS

FIGS. 3A, 3B, 3C and 3D show examples of height profiles displayed on the display unit.

FIG. 6 shows a display example of the measurement result of roughness parameters in the first preferred embodiment.

FIGS. 7A and 7B are one-dimensional graphs in which the replacement of the change in shape of image data with frequency is taken as the horizontal axis.

FIG. 8 shows a display example of the measurement result of roughness parameters in the first preferred embodiment.

DESCRIPTION OF THE PREFERRED EMBODIMENTS

The first preferred embodiment of the present invention is described below with reference to the drawings.

Figure 1:
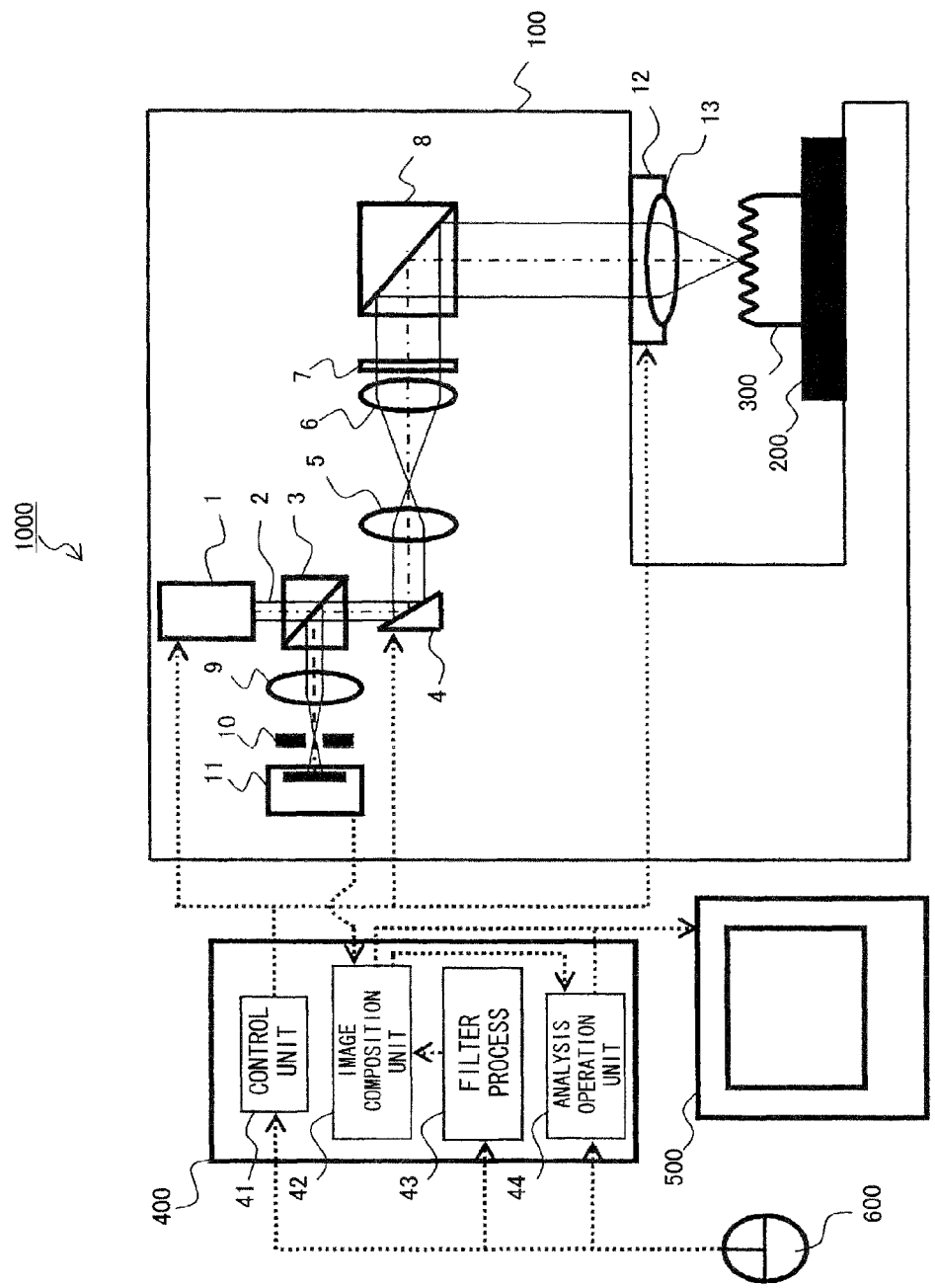
FIG. 1 shows the configuration of an optical three-dimensional measurement device in the preferred embodiment of the present embodiment.

FIG. 1 shows the configuration of an optical three-dimensional measurement device in the preferred embodiment of the present invention.

An optical three-dimensional measurement device 1000 in this preferred embodiment roughly comprises a microscope main body 100, a stage 200, a control unit 400, a display unit 500 and an instruction unit 600, and an observation specimen 300 is mounted on the stage 200.

In this case, the stage 200 can be either electromotive or manual. Furthermore, for the control unit 400, a dedicated controller unit, a personal computer (PC) or the like is used. For the instruction unit 600, a pointing device, such as a mouse and the like a keyboard or a touch panel is used. For the display unit 500, a monitor or the like is used.

Next, the configuration of the optical system of the microscope main body 100 is described.

Although a scanning type confocal laser microscope is used in this preferred embodiment as an optical system constituting the microscope main body 100, the optical system is not limited to this as long as it can obtain the three-dimensional shape information of the observation specimen 300 without touching it. For example, for the optical system, a disk confocal microscope or a white light interference meter can also be used.

In the optical system of the microscope main body 100, firstly laser light 2 is emitted from a laser light source unit 1 as parallel light. Then, the laser light 2 is transmitted through a deflection beam splitter 3 for transmitting or reflecting the laser light 2 depending on the deflection characteristic of the laser light 2, is reflected by a two-dimensional scanning mechanism 4 and scanned in the two-dimensional direction. For the two-dimensional scanning mechanism 4, a galvanoscanner mirror or the like is used.

The two-dimensionally scanned laser light 2 passes through a pupil projection lens 5 and a ¼-wavelength plate 7 in that order. Then, the laser light 2 that has passed through the ¼-wavelength plate 7 changes into circularly deflected light.

The laser light 2 that has passed through the ¼-wavelength plate 7 is reflected by a beam splitter 8 and is collected on the surface of the observation specimen 300 by an object lens 13 held by a revolver 12.

Although the switching method of the object lens 13 by the revolver 12 can be either electromotive or manual, in the following description of this preferred embodiment it is assumed that it is electromotive.

Furthermore, the optical three-dimensional measurement device 1000 in this preferred embodiment is configured in such a way as to change a relative distance in the optical axis between the object lens 13 and the observation specimen 300. Although in this preferred embodiment, the revolver 12 is driven in the direction of the optical axis, the configuration is not limited to this. For example, the stage 200 holding the observation specimen 300 can also be driven in the optical-axis direction.

The switching of the object lens 13 by the revolver 12 and its drive in the optical-axis direction is controlled by the control unit 41 in the control unit 400, which will be described later.

The laser light 2 collected on the surface of the observation specimen 300 is reflected and reaches the deflection beam splitter 3 conversely passing through the above-described optical path.

Since the laser light 2 passes through the ¼-wavelength plate 7 again in the way back of this optical path, its deflection direction changes by 90 degrees compared with that of the laser light 2 immediately emitted from the laser light source 1.

Therefore, the laser light reflected on the surface of the observation specimen 300 is reflected by the deflection beam splitter 3 and is led to a second imaging lens 9.

The laser light 2 passes through the second imaging lens 9 and reaches a pin-hole 10 disposed in a position conjugate with the focus position of the object lens 13.

The laser light 2 that has passed through the pin-hole 10 is received by a laser light receiving device 11. Then, the laser light receiving device 11 outputs an electric signal according to the volume of light of the received laser light 2 and forms a brightness image.

For the laser light receiving device 11, a photo-multiplier tube, a photo detector or the like is used.

Since the pin-hole 10 allows only laser light 2 reflected when collected on the surface of the observation specimen 300 by the object lens 13 to pass through it, only partial laser light 2 focused on the surface of the observation specimen 300 is detected by the laser light receiving device 11.

An electric signal is outputted from the laser light receiving device 11 according to the volume of light of the received laser light 2 and brightness data can be obtained by sampling this electric signal by an image composition unit 42 described below. By taking in this brightness data while changing the relative distance in the optical axis between the object lens 13 and the observation specimen 300 and composing a plurality of it, a flare-less, high-resolution and high contrast fully-focused image (image all the planes of which are focused) of the surface of the observation specimen 300 is formed and also the three-dimensional data of the surface shape of the observation specimen 300 is obtained.

Next, the system of the present invention is described below.

A control unit 400 comprises a control unit 41, an image composition unit 42, a filter process unit 43, and analysis operation unit 44.

The control unit 41 adjusts the volume of light of the laser light source unit 1, adjusts the swing angle of the two-dimensional scanning mechanism 4, switches the object lens 13 via the revolver 12 and drives it in the optical-axis direction and so on. Furthermore, the control unit 41 selects the wavelength of laser light 2 depending on the configuration of the laser light source unit 1. The image composition unit 42 obtains an electric signal from the laser light receiving device 11 in a specific sampling cycle and obtains the three-dimensional data or two-dimensional data including the height direction of the surface shape of the observation specimen 300 (hereinafter called "image data" including these two pieces of data) on the basis of the obtained electric signal. A filter process unit 43 filters the image data obtained by the image composition unit 42 by applying a specific operation process to it. A analysis operation unit 44 measures the surface shape of the observation specimen 300 using image data obtained by the image composition unit 42 and image data obtained by filtered the image data by the filter process unit 43. This measurement includes the distance in a specific position, level, area, volume roughness analysis and the like of the observation specimen 300.

An operator instructs the adjustment of the optical three-dimensional measurement device 1000 in this preferred embodiment and the taking-in of image data using the instruction unit 600 and the obtained image data and the measurement result are displayed on the display unit 500.

Next, the operational process of the optical three-dimensional measurement device 1000 in the case where an operator carries out a measurement is described below with reference to the flowchart shown in FIG. 2.

Firstly, in step S101, as in a usual scanning type confocal laser microscope, an operator sets observation conditions, such as an observation field determined by the object lens 13, the swing angle of the two-dimensional scanning mechanism 4 and the type of the object lens 13, the number of displayed pixels determined by a sampling cycle used for the image composition unit 42 to detect an electric signal outputted from the laser light receiving device 11, the output power and wavelength of the laser light source unit 1, and the like, using the optical three-dimensional measurement device 1000 and focuses the object lens 13 on an observation specimen 300.

The operator sets them using the instruction unit 600, for example, on the basis of GUI displayed on the display unit 500. The instruction contents inputted from the instruction unit 600 is implemented via the control unit 41 in the control unit 400.

Then, in step S102, the optical three-dimensional measurement device 1000 automatically determines a filter process on the basis of the observation conditions set and inputted by the operator in step S101. How to determine this filter process will be described later.

Then, in step 103, the optical three-dimensional measurement device 1000 makes the operator set to take in image data.

Although the optical three-dimensional measurement device 1000 in this preferred embodiment can obtain the plane image data of the observation specimen 300, in this case it is its object to analyze the roughness of the observation specimen 300. Therefore, it is presumed that the optical three-dimensional measurement device 1000 takes in image data including the height information of the observation specimen 300. More specifically, it takes in the two-dimensional image data consisting of the specific line height information of an observation surface or the three-dimensional image data of the surface of the observation specimen 300. In either case, more specifically, as the setting operation for taking in image data, the upper/lower limit position in a height direction to take in is set. The upper/lower limit position operator can be manually set by the operator or be automatically set. In either case, it is set by adjusting the relative distance between the object lens 13 and the observation specimen 300 by driving the revolver 12.

Then, in step S104 the operator takes in the image data on the basis of the observation conditions and the taking-in condition of the image data using the optical three-dimensional measurement device 1000.

In the taking-in of image data, the laser light 2 reflected when the laser light 2 collected on the observation specimen 300 by the object lens 13 is focused is detected by the laser light receiving device 11.

Then, the laser light receiving device 11 outputs an electric signal to the image composition unit 42 according to the volume of light of the detected laser light 2. The image composition unit 42 detects a position in the optical axis of the object lens 13 in the case where this electric signal becomes a maximum in each pixel of the observation field as the height information of the observation specimen 300 and obtains image data. Furthermore, this image data includes the information of the observation condition set in step S101.

Then, in step S105, the optimal filter (hereinafter called "optical high-frequency cut-off filter") process automatically determined for the resolution of the optical three-dimensional measurement device by the filter process unit 43 in step S102 is applied to the taken-in image data.

The contents of the optical high-frequency cut-off filter is automatically determined in step S102 by the observation conditions included in the image data, set in step S101. For example, the observation conditions are determined on the basis of the information of the object lens 13, the wavelength of the laser light 2, an observation field and the number of displayed pixels.

Firstly, the value of NA (=NA) of the object lens 13 is calculated on the basis of the information of the object lens 13 and the cut-off frequency (=fc) of the optical system is calculated according to Equation (1), using the wavelength (=λ) of the laser light 2. Then, the resolution of the optical system is calculated as the reciprocal number of it.

$$fc=\alpha NA/\lambda \quad (1)$$

In Equation (1), α is a prescribed constant and can also be experimentally obtained. For the NA, the actual NA of the laser light 2 collected by the object lens 13 can also be used in addition to the NA of the object lens 13. For example, if the laser light 2 does not fill the pupil of the object lens 13, the actual NA of the laser light 2 collected by the object lens 13 becomes smaller than the NA of the object lens 13. If the number of the type of laser light 2 is one, the value of its wavelength λ becomes constant. Therefore, the value is also determined by a specific constant. Therefore, Equation (1) can also be rewritten as follows.

$$fc=\beta NA \quad (2)$$

In Equation (2), β is a prescribed constant and can also be experimentally obtained.

Then, the resolution per pixel of the image data (hereinafter called "sampling resolution") is calculated on the basis of the observation field and the number of displayed pixels.

The sampling resolution can be obtained by dividing the observation field by the number of pixels of image data. In particular, in the case of a scanning type confocal laser microscope, the observation field of the swing angle of the two-dimensional scanning mechanism 4.

The laser light 2 is scanned in this field, laser light 2 reflected on the observation specimen 300 is received by the laser light receiving device 11 and an electric signal is outputted according to its volume of light. This electric signal is sampled in a specific cycle and is imaged by the image composition unit 42. However, if the observation field is modified and is displayed on the display unit 500 in the same size as before modification, it means to zoom up the observation image.

Therefore, the observation field is changed by this zoom function, thereby the sampling resolution changes. Furthermore, the number of displayed pixels is determined by the number of sampling needed to take in one piece of observation image. Therefore, the sampling resolution can also be changed by changing the number of sampling needed to take in one piece of observation image. When the optical three-dimensional measurement device 1000 has no zoom function, this sampling resolution also becomes a prescribed constant.

Then, the calculated resolution of the optical system and one obtained by multiplying each of two pieces of sampling resolution by the prescribed ratio and the larger value (lower resolution) is determined as the resolution. Since the resolution factor of the larger value determines the resolution of image data, the contents of the optical high-frequency cut-off filter is determined by this value.

As to the contents of the optical high-frequency cut-off filter, for example, the cut-off frequency of image data is calculated as the reciprocal number of the resolution value of the image data calculated here and a Gausian filter (described in ISO11562 1996 version) whose vibration transfer ratio in this cut-off value becomes a prescribed value (for example, 50%) and the like is automatically selected as the optical high-frequency cut-off filter.

Figure 2:
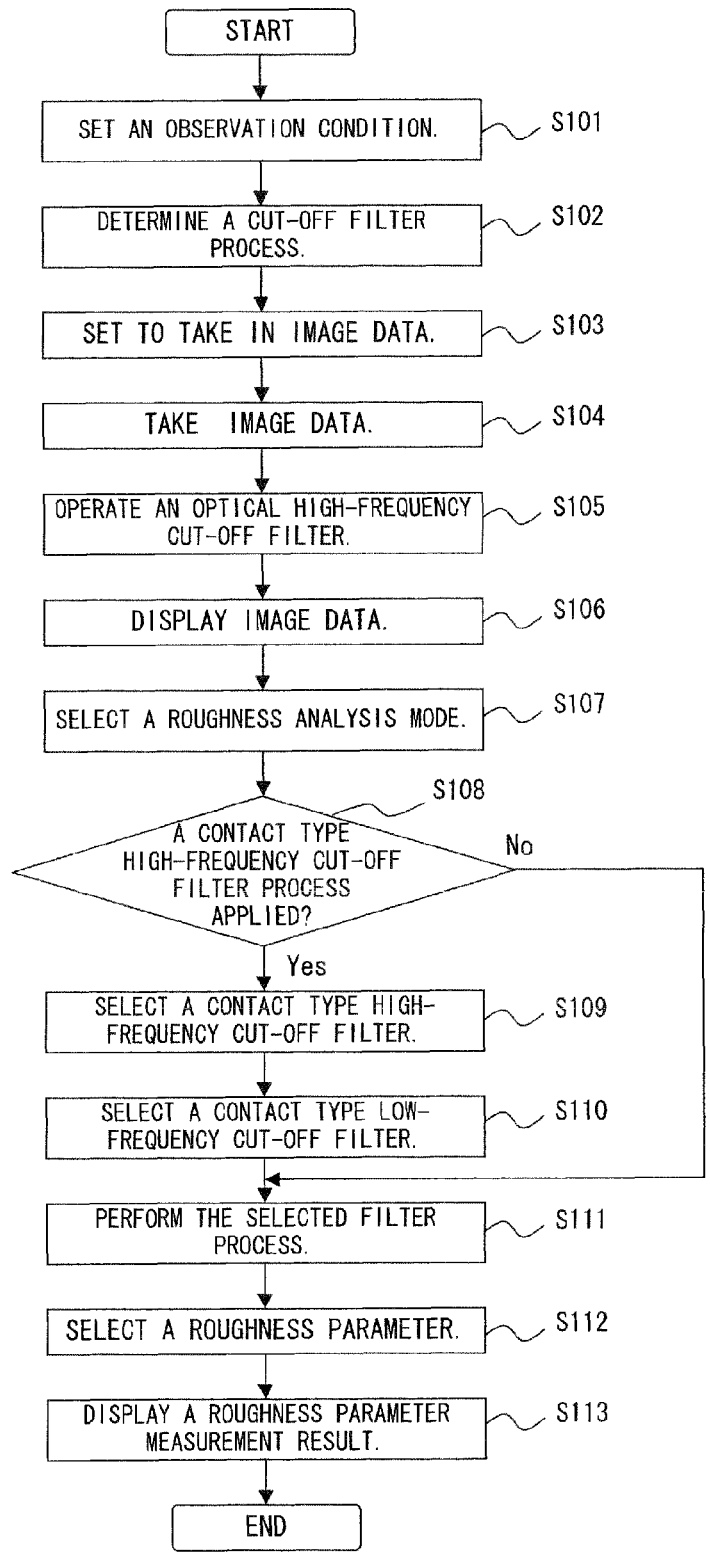
FIG. 2 is a flowchart showing the operational process of the optical three-dimensional measurement device in the case where an operator carries out measurement.

In the process shown in FIG. 2, image data having a frequency equal to or larger than the image data resolution is regarded as noise by the optical high-frequency cut-off filter determined in step S105 and its amplitude is cut by the filter process. The image data obtained thus is displayed on the display unit in step S106.

In this case, if the obtained image data is the above-described two-dimensional image data, the height data is displayed as a height profile in a specific line shape of the observation specimen 300, as shown in FIG. 3A.

If it is three-dimensional image data, instead of the height profile as shown in FIG. 3A, it can also be displayed as a fully-focused image, a bird's eye view image, a contour image, a plane image in which the height direction is replaced with display brightness and the like.

In the above-described display, information about a filter used in that stage is also displayed together.

Since in step S106 as the filter process, only an optical high-frequency cut-off filter is applied, in FIG. 3A a symbol (λop here) indicating an optical high-frequency cut-off filter is displayed at the right top of the image data displayed.

Then, in step S107 the optical three-dimensional measurement device 1000 makes the operator select the mode of roughness analysis. More specifically, the operator selects either line roughness analysis or surface roughness analysis. If two-dimensional image data is selected to take in step S103, surface roughness analysis cannot be selected. In the following description, it is assumed that line roughness analysis is selected.

Then, in step S108 the optical three-dimensional measurement device 1000 makes the operator determine whether to apply both the fine roughness cut-off filter of a contact type roughness meter (hereinafter called "contact type high-frequency cut-off filter) and the cut-off filter of a contact type roughness meter (hereinafter called "low-frequency cut-off filter").

If both contact type high-frequency cut-off filter and contact type low-frequency cut-off filter are applied, sometimes the same filter conditions are used, for example, in order to compare the value with a value measured by a contact type roughness meter before.

If both contact type high-frequency cut-off filter and contact type low-frequency cut-off filter are applied, the operator determines the type of the contact type high-frequency cut-off filter in step S109 and of the contact type low-frequency cut-off filter in step S110.

If neither contact type high-frequency cut-off filter nor contact type low-frequency cut-off filter is applied in step S108, the process skips to step S111.

Figure 4:
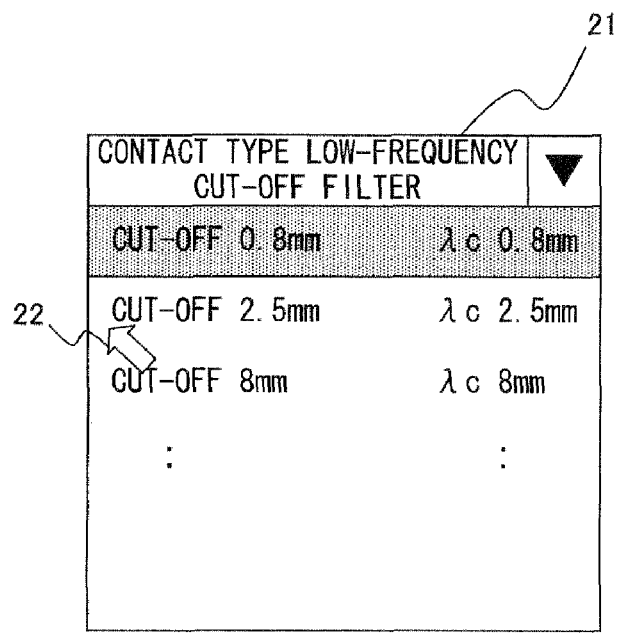
FIG. 4 is a drop-down list for selecting a filter.

In steps S109 and 110, a filter can be selected from a drop-down list 21 displayed on the display unit 500, shown in FIG. 4 and the like. All filters to be selected are shown in the drop-down list 21 and their abbreviations are shown to their right ends. Thus, a desired filter is selected by operating a cursor 22 on the instruction unit 600.

Although in the flow shown in FIG. 2, it is determined whether both contact type high-frequency cut-off filter and contact type low-frequency cut-off filter are applied or neither contact type high-frequency cut-off filter nor contact type low-frequency cut-off filter is applied, only a contact type high-frequency cut-off filter or a contact type low-frequency cut-off filter can also be selected.

Then, the optical three-dimensional measurement device 1000 applies various filter processes set in step S102 or selected in steps S109 and S110. When the filter processes are performed, filter information displayed in image data is updated.

FIG. 3B shows that it is shown on the display screen of the display unit 500 that as a contact type high-frequency cut-off filter and a contact type low-frequency cut-off filter, the filter processes of λs 2.5 mm and λc 0.8 mm, respectively, are applied.

If a contact type high-frequency cut-off filter process is not selected in step S109, the information (λop) of an optical high-frequency cut-off filter applied in step S105 is displayed instead of λs 2.5 mm displayed in FIG. 3B. If a contact type low-frequency cut-off filter is not selected in step S110, nothing is displayed in the part of λc 0.8 mm displayed in FIG. 3B.

The optical three-dimensional measurement device 1000 can store image data to which a filter process is applied and which is displayed on a screen, as data.

For example, when a height profile is displayed as image data, it can be outputted and stored in a CSV file and the like as text output. Furthermore, when a fully-focused image, a bird's eye view image, a contour image, a plane image in which the height direction is replaced with display brightness or the like is displayed as image data, it can be stored as the image data of a bmp file, a jpeg file, a tiff file and the like. Alternatively, it can be stored in its own file format which can be analyzed by the optical three-dimensional measurement device 1000.

Then, roughness parameters (for example, arithmetic mean height Pa, Ra and Wa and maximum sectional height Pz, Rz and Wz which are defined in JIS and the like) are analyzed. In step S112 the operator selects roughness parameters to be desired to analyze using the optical three-dimensional measurement device 1000.

Figure 5:
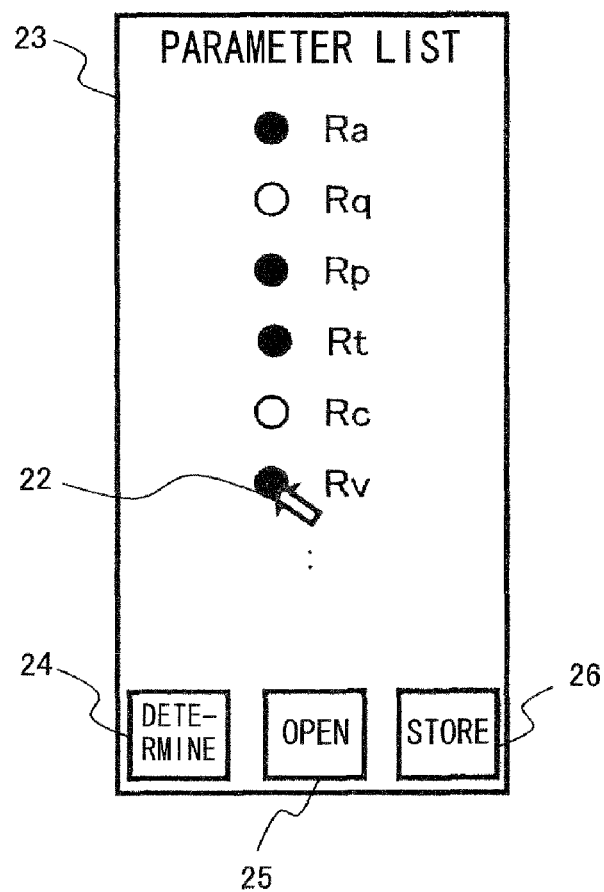
FIG. 5 is a list of roughness parameters.

In the selection of roughness parameters, the roughness parameter list 23 shown in FIG. 5 is displayed on the display screen as GUI and the operator selects all parameters to be desired to analyze using the cursor 22. When selecting a "determine" button 24 after the selection is completed, the analysis operation unit 44 measures the selected parameters. In this case, if a "store" button 26 is selected, the selection contents of the parameter list 23 can be stored. If an "open" button 25 is selected, the stored selection contents of the parameter list 23 can be read out. Thus, labor needed to select a parameter to be desired to analyze from many roughness parameter lists at every times of analysis can be saved.

The parameter contents shown in the roughness parameter list 23 displayed when selecting a roughness parameter in step S112 differ in the cases of line roughness analysis and surface roughness analysis and the contents of a roughness parameter list that an operator can select also change.

In step S113 the optical three-dimensional measurement device 1000 displays the measurement result in step S112 on the display unit 500, as shown in FIG. 6.

FIG. 6 shows the analysis result of roughness parameters selected in FIG. 5.

Attention is paid to how much undulation the measurement result has, how much convexity and concavity the observation specimen has and so on and the analysis methods of roughness parameters for comparing a maximum value with a minimum value, calculating the average value of all values and so on are defined in JIS and the like.

As the measurement result shown in FIG. 6, not only the numeric values of roughness parameters but also the information of an applied filter are displayed. For example, information about an optical high-frequency cut-off filter or a contact type high-frequency cut-off filter is shown in the field of "high-frequency" and information about a contact type low-frequency cut-off filter is shown in the field of "high-frequency".

These analysis results can be outputted and stored in a CSV file or the like, for example, as text output.

As to the file information displayed in this case, the abbreviations of filters can be displayed as shown in FIG. 6. Alternatively, each piece of filter information can be displayed by changing the color of each measurement result and its portion for displaying it.

At this point, the operation of roughness analysis by the optical three-dimensional measurement device 1000 in this preferred embodiment is completed.

Next, the relation among three types of filter processes performed by the optical three-dimensional measurement device 1000 is described with reference to FIG. 7.

FIG. 7 is one-dimensional graph in which the replacement of the change in shape of image data with frequency is taken as the horizontal axis.

In FIG. 7, in the further right it is located, the higher frequency it means. The three-dimensional measurement of a shape having a high frequency requires the higher resolution of the device.

FIG. 7A shows the case where a contact type high-frequency cut-off filter is not applied in step S109.

Since a contact type high-frequency cut-off filter is not applied, an optical high-frequency cut-off filter and a contact type low-frequency cut-off filter are applied. Therefore, only frequency components in a marked band, located between the cut-off frequencies of these two filters become analysis targets and the amplitude of the other components is suppressed to a low level by a filter process. In this case, since the cut-off filter on the high frequency side is set in the limit part of the optical system, high-resolution roughness analysis utilizing the resolution of the optical three-dimensional measurement device 1000 can be realized.

FIG. 7B shows the case where a contact type high-frequency cut-off filter is applied in step S109.

Since the cut-off frequency of a contact type high-frequency cut-off filter is lower than that of an optical high-frequency cut-off filter, only frequency components in a marked band, located between the cut-off frequencies of the contact type high-frequency cut-off filter and the contact type low-frequency cut-off filter are filtered and become analysis targets, and the amplitude of the other components is suppressed to a low level by a filter process.

Thus, analysis can be performed on the same filter condition as the conventional optical three-dimensional measurement device and a contact type roughness meter, for example, the quality control of an observation specimen and the like can be carried out using an inspection method common to the contact type roughness meter, the existing optical three-dimensional observation device.

However, as to a frequency band between the contact type high-frequency cut-off filter and optical high-frequency cut-off filter possessed by the optical three-dimensional measurement device 1000 as its resolution, its amplitude is reduced by the contact type high-frequency cut-off filter and roughness analysis is carried out by reducing the resolution of the optical three-dimensional measurement device 1000.

The operator determines whether to perform a contact type high-frequency cut-off filter process in step S108 understanding these relations.

Although in this example, the operation of the optical three-dimensional measurement device 1000 in the procedure of carrying out line roughness analysis has been described, the three-dimensional measurement device 1000 can also carries out surface roughness analysis.

When carrying out surface roughness analysis by the optical three-dimensional measurement device 1000, surface roughness analysis is selected in step S106 shown in FIG. 2.

In this case, as described above, image data to analyze must be three-dimensional image data. Although the procedure after that is the same as line roughness analysis, as the display of image data, besides a height profile, image display, such as a fully-focused image, a bird's eye view image, a contour image, a plane image in which the height direction is replaced with display brightness and the like are possible.

According to the optical three-dimensional measurement device 1000 in this preferred embodiment, an operator has no trouble of finding an optimal filter condition for automatically selecting and performing an optimal optical high-frequency cut-off filter process on the basis of observation conditions without combining various filter processes for an optimal filter setting.

Furthermore, by performing an optical high-frequency cut-off filter process, roughness analysis using high-resolution image data which is the feature of the optical three-dimensional measurement device becomes possible.

Furthermore, since the application/non-application of a contact type high-frequency cut-off filter process can be selected, filter processes can be selected and used according to the usage of an operator.

For example, if roughness analysis using high-resolution image data is desired, a contact type high-frequency cut-off filter process can be cancelled. If the same inspection method as the conventional contact type roughness meter, the quality control of an observation specimen by quality standards based on roughness analysis or the like is desired, a contact type high-frequency cut-off filter process can be applied.

Next, the second preferred embodiment of the optical three-dimensional measurement device 1000 is described.

The second preferred embodiment is characterized in that image data obtained by applying a plurality of combinations of different filter processes to the same image data and their analysis results can be simultaneously displayed.

Therefore, the configuration of the optical three-dimensional measurement device 1000 in this preferred embodiment is the same as that of the first preferred embodiment shown in FIG. 1 except for that of the image composition unit 42. Therefore, its detailed description is omitted here.

Next, the operation of the optical three-dimensional measurement device 1000 in the second preferred embodiment is described with reference to the flowchart shown in FIG. 2 as in the first preferred embodiment.

In FIG. 2, since the process up to step S111 of this preferred embodiment is the same as that of the first preferred embodiment, its detailed description is omitted here.

In step S111, when also desiring to carry out analysis on another filter condition (hereinafter called "second filter condition") after performing a filter process selected on a firstly selected condition (hereinafter called "first filter condition"), the optical three-dimensional measurement device 1000 selects the application/non-application of a contact type high-frequency cut-off filter process again. Therefore, the process returns to step S108 shown in FIG. 2.

Then, in step S109 the application/non-application of a contact type high-frequency cut-off filter process is selected in the same procedure as that of setting the first filter condition. Furthermore, in step S110 the type of a contact type low-frequency cut-off filter process is selected in the same way. Since the selection method of various filters is the same as that of the first preferred embodiment shown in FIG. 4, its detailed description is omitted here.

After the second filter condition is set as described above, in step S112 the set second filter process is performed. Then, the image composition unit 42 composes the result of the filter process on the first filter condition and that of the filter process on the second filter condition. Then, image data displayed on the display unit 500 changes as shown in FIG. 3C.

In FIG. 3C, two height profiles obtained by applying a filter process on two different filter conditions are simultaneously displayed. Furthermore, in order to classify the two height profiles, they have different colors and are distinguished. In accordance with it, their displayed pieces of filter information also have different colors.

As to the display method of a plurality of height profiles, for example in FIG. 3D, each height profile can have a different type of line and its filter condition can be displayed in accordance with its line type.

If desiring to obtain the result of further applying a filter on another different filter condition, the process returns to step S108 again and by repeating the same procedure, image data further obtained on another filter condition is consecutively added and displayed. Furthermore, the data is overlapped with the data of two times in the past and displayed.

By the way, for example, in step S107 surface roughness analysis is selected, a fully-focused image, a bird's eye view image, a contour image, a plane image in which the height direction is replaced with display brightness and the like can be displayed as the image data. In this case plurality of image data can be overlapped with changing the color of each layer and displayed. Furthermore, each piece of data can also be independently disposed and displayed.

All pieces of displayed image data can be stored as an image file as in the first preferred embodiment.

After displaying height data on all filter conditions, which an operator desires to analyze, in step S112 the optical three-dimensional measurement device 1000 makes the operator select roughness parameters. And in step S113 the optical three-dimensional measurement device 1000 displays the analysis result of roughness parameters.

In this case, since the selection method of roughness parameters is the same as that of the first preferred embodiment shown in FIG. 5, its detailed description is omitted here.

The analysis result of roughness parameters are displayed as shown in FIG. 8.

In FIG. 8, the analysis results obtained on all the displayed filter conditions are shown.

According to the optical three-dimensional measurement device 1000 in the second preferred embodiment, image data obtained by applying a plurality of different filter processes and their analysis results can be displayed in addition to the effect of the optical three-dimensional measurement device 1000 in the first preferred embodiment. Therefore, it has the effect that image data obtained by applying a plurality of different filter processes and their analysis results can be easily compared. Furthermore, although a plurality of filter process functions are mounted, their displayed image data and analysis results include their filter information. Therefore, there is no possibility that each image data and analysis result may be wrongly recognized.

Next, the optical three-dimensional measurement device 1000 in the third preferred embodiment is described.

The configuration of the optical three-dimensional measurement device 1000 in the third preferred embodiment is the same as that of the first preferred embodiment shown in FIG. 1 except for that of the image composition unit 42.

The optical three-dimensional measurement device 1000 in the third preferred embodiment differs from those in the first and second preferred embodiments when displaying a height profile as image data.

Although in the first preferred embodiment, only the cross-sectional curve of the observation specimen 300 to which a filter process is applied is displayed as a height profile, in the optical three-dimensional measurement device 1000 in the third preferred embodiment, a roughness curve obtained by extracting high-degree components from the cross-sectional curve or an undulation curve obtained by extracting low-degree components can be simultaneously displayed in addition to this.

Figure 9:
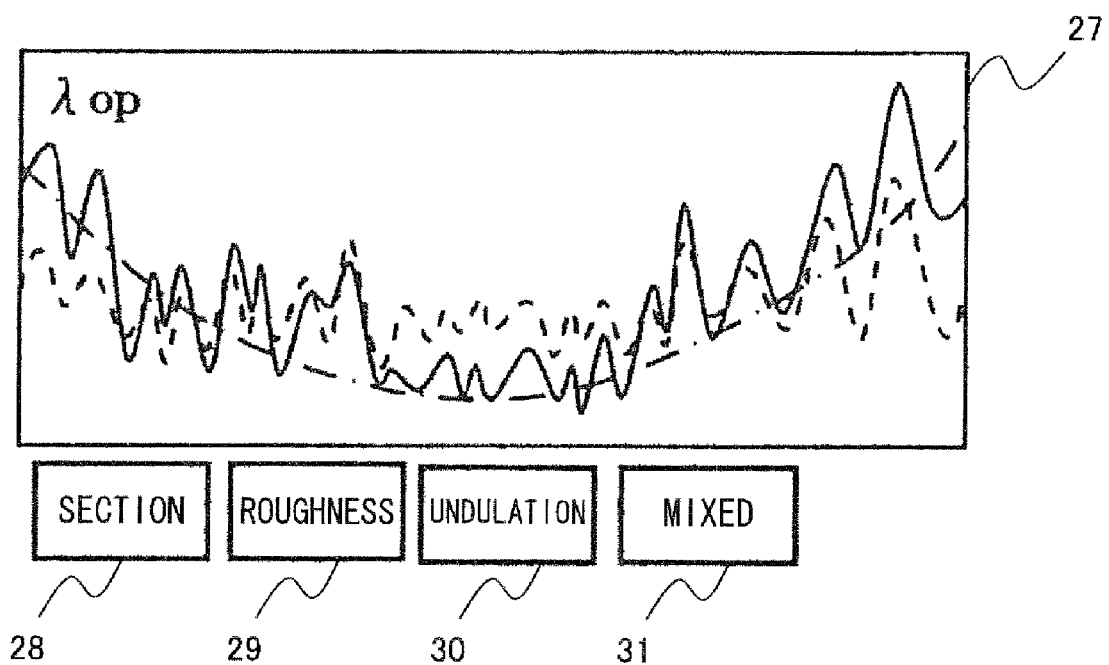
FIG. 9 shows the display screen of an optical three-dimensional measurement device which also simultaneously displays a cross-sectional curve, a roughness curve and an undulation curve as a height profile.

FIG. 9 shows the display screen of the optical three-dimensional measurement device in the third preferred embodiment which also simultaneously displays a cross-sectional curve, a roughness curve and an undulation curve as a height profile.

A profile window 27 simultaneously displays three profiles of different line types and they are a cross-sectional curve, a roughness curve and an undulation curve. Furthermore, the profile window 27 also displays the information of applied filters as in FIGS. 3A and 3B.

If desiring to simultaneously display three profiles, as shown in FIG. 7, push a "mixed" button 31 on the GUI displayed on the display screen shown in FIG. 9. If desiring to separately display three profiles, a profile to display can be switched by selecting from a "section" button 28, a "roughness" button 29 and an "undulation" button 30.

Although in FIG. 9, three profiles are distinguished by changing their types of lines, they can also be changing their colors.

Furthermore, cross-sectional curves, roughness curves and undulation curves obtained by applying a plurality of different filter processes can also be simultaneously outputted. If in this case, a plurality of pieces of filter information is distinguished by changing the colors of profiles, the types of profiles can be distinguished by changing the line types of profiles. Conversely, if a plurality of pieces of filter information is distinguished by changing the line types of profiles, the types of profiles can be distinguished by changing the colors of profiles.

Furthermore, only the profiles of the types of buttons selected from all the profiles to which each filter process is applied can also be simultaneously displayed by selecting any of the "section" button 28, the "roughness" button 29 and the "undulation" button 30.

According to the optical three-dimensional measurement device 1000 in the third preferred embodiment, not only the states of roughness and undulation components of the observation specimen 300 can be checked at a glance, but also the height profiles obtained on different filter conditions, of the roughness and undulation components can be easily compared.

Furthermore, although a plurality of filter process functions are mounted, their displayed height profiles include their filter information. Therefore, there is no possibility that each height profile may be wrongly recognized.

As described above, since in the optical three-dimensional measurement device 1000 of the first to third preferred embodiments, an optimal noise-eliminating filter process can be applied on the basis of observation conditions at the acquisition time of three-dimensional image data, a three-dimensional measurement sufficiently utilizing the high-resolution of the optical three-dimensional measurement device can be realized.

Furthermore, since an operator has no trouble of finding an optimal noise-eliminating filter condition by utilizing a plurality of mounted image process filter functions, the variations in analysis results by the operator can be suppressed.

Furthermore, in the device in which observation conditions can be modified, such as a scanning type confocal laser microscope, the labor of setting an optimal noise-eliminating filter condition according to observation conditions can be saved.

Furthermore, since the cut-off filter function of a contact type roughness meter is mounted, the height data to which the conventional optical three-dimensional measurement device or contact type roughness meter applies a cut-off filter function and its analysis result can also be simultaneously obtained. Thus, for example, if quality control is carried out on the basis of the measurement result of components processed at a production site by the conventional contact type roughness meter, the quality control can be carried out by the conventional inspection method and quality standards. On the other hand, in the development of a new fine component, far more precise roughness analysis can be carried out with high-resolution.

Furthermore, if data is desired to compare in a different filter condition, the display of height data and their analysis results on different filter conditions can be selectively switched and be simultaneously displayed. Therefore, the data can be easily compared.

Furthermore, by adding the information of an applied filter to its height data and analysis result, an operator can easily see the height data and analysis result, thereby making the comparison of data far easier.

Furthermore, in a device in which observation conditions can be modified, such as a scanning type confocal laser microscope and the like, the labor of setting an optimal noise-eliminating filter condition according to observation conditions can be saved.

Although for the configuration of the optical three-dimensional measurement device 1000, that of a scanning type confocal laser microscope is used, it can also be a white interference meter, a disk confocal microscope and the like.

What is claimed is:

1. An optical three-dimensional measurement device provided with observation illumination light for illuminating an observation specimen, an object lens for collecting the observation light on the observation specimen and a display unit for displaying an observation image and its measurement result that are obtained via the object lens, comprising;

a filter process determination unit for determining a first filter process on the basis of observation conditions used when taking in a three-dimensional image of the observation specimen; and
   a filter process unit for applying the first filter process determined by the filter process determination unit to the measurement image or the measurement result.

2. The optical three-dimensional measurement device according to claim 1, wherein
   the filter process unit applies a second process filter being a cut-off filter process for eliminating high-frequency of a contact type roughness meter instead of the first filter process according to an instruction of an operator.

3. The optical three-dimensional measurement device according to claim 2, wherein
   one or more height profiles to which at least one of the first and second filter processes is applied are selected and displayed on the display unit.

4. The optical three-dimensional measurement device according to claim 3, wherein
   the filter process unit displays a type of a filter applied to each of the height profiles displayed on the display unit by changing a color of each of the height profiles.

5. The optical three-dimensional measurement device according to claim 3, wherein
   the filter process unit displays a type of a filter applied to each of the height profiles displayed on the display unit by changing a line type of each of the height profiles.

6. The optical three-dimensional measurement device according to claim 2, wherein
   the filter process unit further performs a third filter process being a cut-off filter process for eliminating low frequency of a contact type roughness meter and after applying one of the first and third filter processes to the observation image or its measurement result, carries out roughness parameter analysis, selects one or more of the analysis results and displays them on the display unit.

7. The optical three-dimensional measurement device according to claim 2, wherein
   the filter process unit further comprises an image composition unit for displaying information indicating a type of the first or second filter process which is applied the observation image or the measurement result that is displayed on the display unit, together with the observation image or the measurement result on the display unit.

8. The optical three-dimensional measurement device according to claim 1, wherein
   the observation condition includes at least one of an NA of the object lens, a wavelength of the observation illumination light, the observation field and the number of displayed pixels.

9. The optical three-dimensional measurement device according to claim 8, wherein
   the observation condition includes at least NA of the object lens.

10. The optical three-dimensional measurement device according to claim 1, further comprising
    a wavelength modification unit capable of modifying a wavelength of the observation illumination light,
   wherein
    the wavelength of the observation illumination light determined by the wavelength modification unit is included in the observation condition.

11. The optical three-dimensional measurement device according to claim 1, which is a scanning type confocal laser microscope using laser light as the observation illumination light, comprising;

a two-dimensional scanning mechanism for enabling the laser light to scan in a two-dimensional direction;

a light receiving device for detecting volume of light of the laser light; and a confocal iris disposed in a position conjugate with a focal point of the object lens.

12. An optical three-dimensional measurement device provided with observation illumination light for illuminating an observation specimen, an object lens for collecting the observation light on the observation specimen and a display unit for displaying an observation image and the measurement result that are obtained via the object lens, comprising;

a filter process determination means for determining a first filter process on the basis of an observation condition used when taking in a three-dimensional image of the observation specimen; and a filter process means for applying the first filter process determined by the filter process determination means to the observation image or the measurement result.

13. An optical three-dimensional measurement method implemented by an optical three-dimensional measurement provided with observation illumination light for illuminating an observation specimen, an object lens for collecting the observation light on the observation specimen and a display unit for displaying an observation image and its measurement result that are obtained via the object lens, comprising;

determining a first filter process on the basis of observation conditions used when taking in a three-dimensional image of the observation specimen; and applying the determined first filter process to the measurement image or the measurement result.

* * * * *